US011437044B2

(12) United States Patent
Guo et al.

(10) Patent No.: US 11,437,044 B2
(45) Date of Patent: Sep. 6, 2022

(54) INFORMATION PROCESSING APPARATUS, CONTROL METHOD, AND PROGRAM

(71) Applicant: NEC Corporation, Tokyo (JP)

(72) Inventors: Ling Guo, Tokyo (JP); Hitoshi Yamamoto, Tokyo (JP); Takafumi Koshinaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/255,511

(22) PCT Filed: Jun. 27, 2018

(86) PCT No.: PCT/JP2018/024391
§ 371 (c)(1),
(2) Date: Dec. 23, 2020

(87) PCT Pub. No.: WO2020/003413
PCT Pub. Date: Jan. 2, 2020

(65) Prior Publication Data
US 2021/0287682 A1    Sep. 16, 2021

(51) Int. Cl.
*G10L 15/04* (2013.01)
*G10L 17/12* (2013.01)
(Continued)

(52) U.S. Cl.
CPC .............. *G10L 17/12* (2013.01); *G10L 17/20* (2013.01); *G10L 15/04* (2013.01); *G10L 17/02* (2013.01)

(58) Field of Classification Search
CPC ................................ G10L 17/02; G10L 15/04
See application file for complete search history.

(56) References Cited

U.S. PATENT DOCUMENTS

| 2005/0027528 A1* | 2/2005 | Yantorno ................ G10L 17/02 |
|---|---|---|
| | | 704/E17.005 |
| 2010/0114572 A1 | 5/2010 | Tani et al. |
| 2016/0019889 A1 | 1/2016 | Alvarez Guevara et al. |

FOREIGN PATENT DOCUMENTS

| EP | 0191531 A2 * | 2/1985 | |
|---|---|---|---|
| EP | 0191531 A2 * | 8/1986 | ............. G10L 15/04 |

(Continued)

OTHER PUBLICATIONS

Japanese Office Communication for JP Application No. 2020-526784 dated Nov. 16, 2021 with English Translation.
(Continued)

*Primary Examiner* — Feng-Tzer Tzeng

(57) ABSTRACT

The information processing apparatus (2000) computes a first score representing a degree of similarity between the input sound data (10) and the registrant sound data (22) of the registrant (20). The information processing apparatus (2000) obtains a plurality of pieces of segmented sound data (12) by segmenting the input sound data (10) in the time direction. The information processing apparatus (2000) computes, for each piece of segmented sound data piece (12), a second score representing the degree of similarity between the segmented sound data (12) and the registrant sound data (22). The information processing apparatus 2000 makes first determination to determine whether a number of speakers of sound included in the input sound data (10) is one or multiple, using at least the second score. The information processing apparatus (2000) makes second determination to determine whether the input sound data (10) includes the sound of the registrant (20), based on the first score, the second scores, and a result of the first determination.

17 Claims, 7 Drawing Sheets

(51) Int. Cl.
    *G10L 17/20*     (2013.01)
    *G10L 17/02*     (2013.01)

(56) References Cited

FOREIGN PATENT DOCUMENTS

| | | |
|---|---|---|
| EP | 1564722 A1 | 8/2005 |
| JP | 2005-227758 A | 8/2005 |
| JP | 2017-517027 A | 6/2017 |
| WO | 2008/117626 A1 | 10/2008 |
| WO | 2017/212235 A1 | 12/2017 |

OTHER PUBLICATIONS

International Search Report for PCT Application No. PCT/JP2018/024391, dated Sep. 11, 2018.
Harmse Jorgen, Steven D. Beck, and Hirotaka Nakasone, "Speaker Recognition Score-Normalization to Compensate for SNR and Duration", Speaker and Language Recognition Workshop, 2006, pp. 1-8.
Jitendra Ajmera, Iain McCowan, and Herve Bourlard, "Robust Speaker Change Detection", IEEE Signal Processing Letters, vol. 11, No. 8, Aug. 2004, pp. 649-651.
Extended European Search Report for EP Application No. EP18923907.2 dated May 3, 2021.

\* cited by examiner

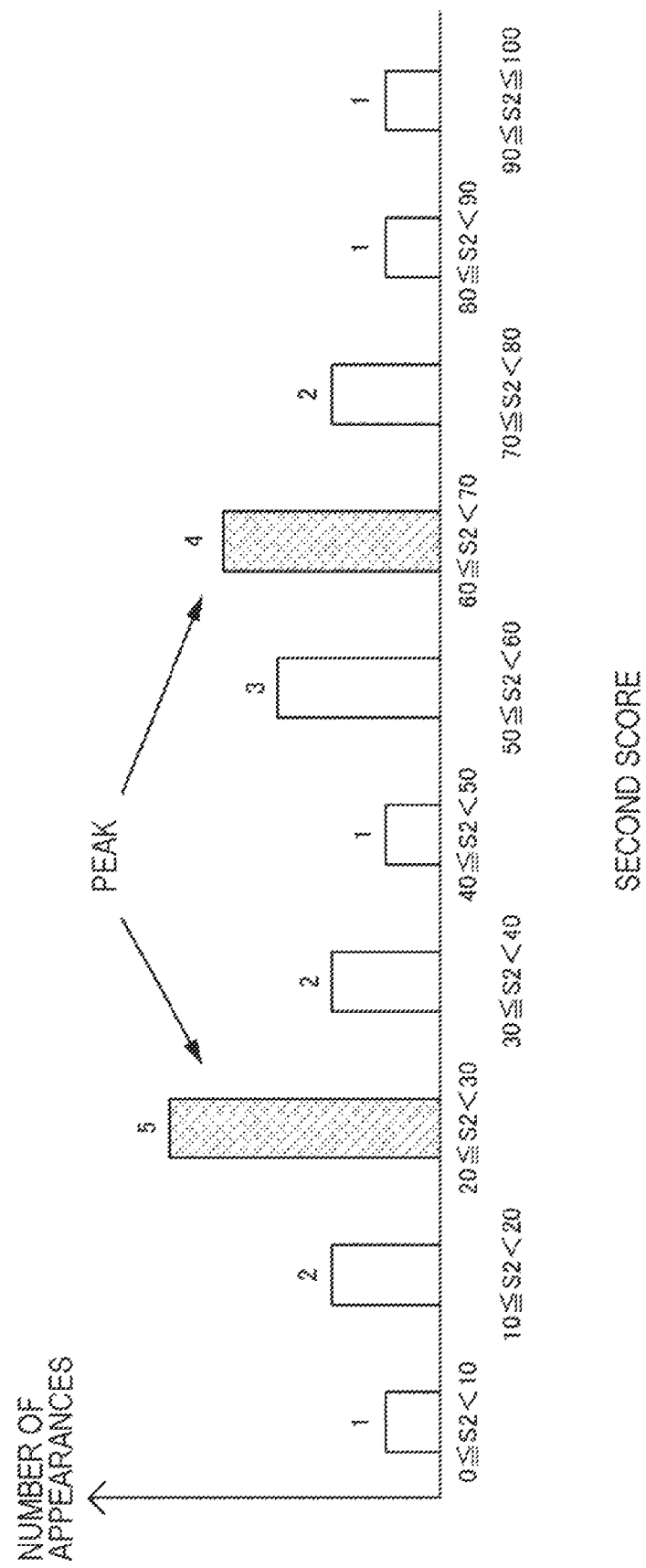

INFORMATION PROCESSING APPARATUS, CONTROL METHOD, AND PROGRAM

This application is a National Stage Entry of PCT/JP2018/024391 filed on Jun. 27, 2018, the contents of all of which are incorporated herein by reference, in their entirety.

TECHNICAL FIELD

The example embodiments relate to a technique of recognizing a speaker of sound included in sound data.

BACKGROUND ART

Technologies have been developed to recognize the speaker from the input sound. For example, Patent Document 1 discloses a technology of computing a feature value of an input sound signal, computing a speaker score by inputting the computed feature value into a speaker model, and determining a speaker based on the computed speaker score.

Here, since sound recorded under an optional environment is often used as the input sound, the input sound may include sound other than the sound of the speaker to be recognized. Since the input sound includes the sound other than the sound of the speaker to be recognized, the accuracy of speaker recognition may be lowered.

Therefore, a technique of improving the accuracy of speaker recognition has been developed for the input sound including the sound other than the sound of the speaker to be recognized. For example, Non-Patent Document 1 discloses a score normalization method that is robust against background noise. This method includes dividing a recognized sound into two parts, a sound section and a non-sound section. Furthermore, score normalization is performed using an SNR (signal noise ratio) of the recognized sound, an SNR of a registered sound, and a score obtained for a speaker recognition. Then, using the normalized score, it is determined whether or not the speaker of the recognized sound is a registrant.

Here, the SNR of the recognized sound mainly represents the amount of noise (that is, background noise) included in the non-sound section, and the lower the SNR, the smaller the score. By performing speaker recognition in consideration of background noise in such a manner, speaker recognition that is robust against noise is achieved.

RELATED DOCUMENT

Patent Document

[Patent Document 1] International Publication No. 2008/117626

Non-Patent Documents

[Non-Patent Document 1] Harmse Jorgen, Steven D. Beck, and Hirotaka Nakasone, "Speaker recognition score-normalization to compensate for snr and duration", Speaker and Language Recognition Workshop, 2006

[Non-Patent Document 2] Ajmera Jitendra, Iain McCowan, and Herve Bourlard, "Robust speaker change detection", IEEE Signal Processing Letters, 2004.

SUMMARY

Technical Problem

The recognized sound may include not only background noise but also sounds of other persons other than the speaker to be recognized. In the method of Non-Patent Document 1, it is difficult to improve the recognition accuracy of such an input sound mixed with the sound of another person. This is because, unlike the background noise included in the non-sound section, the sounds of the other persons are included in the sound section together with the sound of the speaker to be recognized, so the degree of mixing of the sounds of the other persons cannot be expressed by the above-mentioned SNR.

The example embodiments have been made in view of the above-mentioned problems, and one of the objects thereof is to provide a technique of improving the accuracy of speaker recognition in a case where sounds of persons other than the speaker to be recognized are included in the input sound.

Solution to Problem

An information processing apparatus of the example embodiments comprises: 1) a first computing unit that computes a first score representing a degree of similarity between input sound data and registrant sound data which is sound data of a registrant; 2) a second computing unit that segments the input sound data in a time direction so as to divide the input sound data into a plurality of pieces of segmented sound data and computes a second score representing a degree of similarity between the segmented sound data and the registrant sound data for each of the plurality of pieces of segmented sound data; 3) a first determination unit that determines whether a number of speakers of sound included in the input sound data is one or multiple, using at least the second score; and 4) a second determination unit that determines whether the input sound data includes sound of the registrant, based on the first score, the second scores, and a determination result obtained by the first determination unit.

The control method of the example embodiments is executed by a computer. The control method comprises: 1) a first computing step of computing a first score representing a degree of similarity between input sound data and registrant sound data which is sound data of a registrant; 2) a second computing step of segmenting the input sound data in a time direction so as to divide the input sound data into a plurality of pieces of segmented sound data and computing a second score representing a degree of similarity between the segmented sound data and the registrant sound data for each of the plurality of pieces of segmented sound data; 3) a first determination step of determining whether a number of speakers of sound included in the input sound data is one or multiple, using at least the second score; and 4) a second determination step of determining whether the input sound data includes sound of the registrant, based on the first score, the second scores, and a determination result obtained by the first determination step.

A program of the example embodiments causes a computer to execute each step of the control method of the example embodiments.

Advantageous Effects

According to the example embodiments, there is provided a technique of improving the accuracy of speaker recognition in a case where sounds of persons other than the speaker to be recognized are included in the input sound.

BRIEF DESCRIPTION OF THE DRAWINGS

The above-described object, other objects, features, and advantages will be further clarified by the preferred example embodiments described below and the accompanying drawings.

FIG. 7 is a diagram illustrating a histogram of the second scores.

DESCRIPTION OF EMBODIMENTS

Hereinafter, example embodiments will be described with reference to the drawings. In all the drawings, the same constituents will be referred to with the same numerals, and the description thereof will not be repeated. Further, in each block diagram, each block represents a configuration of a functional unit instead of a configuration of a hardware unit, unless otherwise described.

Example Embodiment 1

<Outline>

Figure 1:
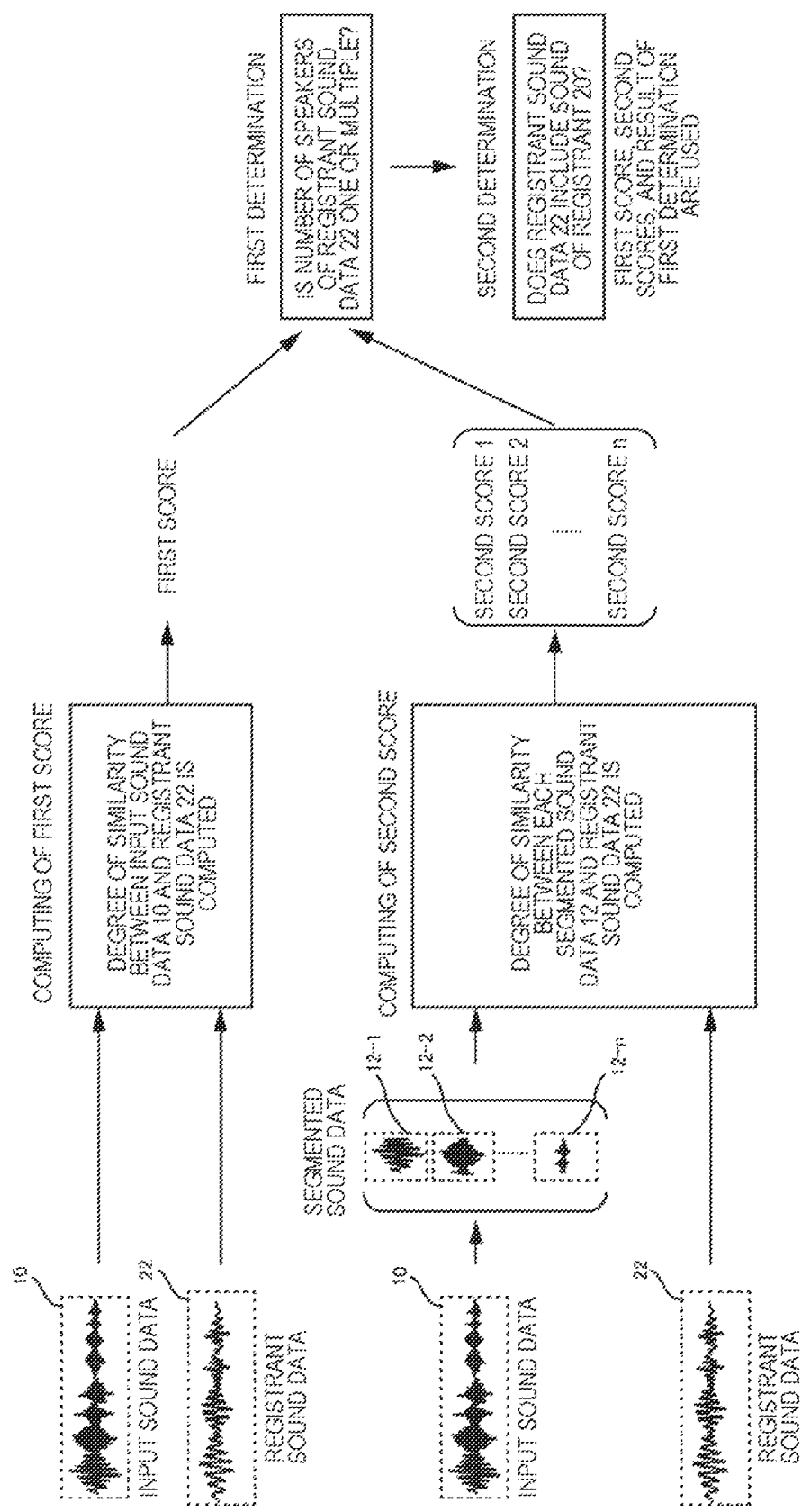
FIG. 1 is a diagram conceptually illustrating processing executed by an information processing apparatus of the present example embodiment.

FIG. 1 is a diagram conceptually illustrating an outline of processing executed by an information processing apparatus 2000 of the present example embodiment. The information processing apparatus 2000 recognizes speakers of sounds included in input sound data 10. The information processing apparatus 2000 compares the input sound data 10 with registrant sound data 22 representing a sound of the registrant 20 (not illustrated). Hereinafter, operations of the information processing apparatus 2000 will be described more specifically.

First, the information processing apparatus 2000 computes a first score representing the degree of similarity between the input sound data 10 and the registrant sound data 22. Further, the information processing apparatus 2000 obtains a plurality of pieces of segmented sound data 12 by segmenting the input sound data 10 in the time direction. Then, the information processing apparatus 2000 computes, for each segmented sound data 12, a second score representing the degree of similarity between the segmented sound data 12 and the registrant sound data 22.

The information processing apparatus 2000 makes first determination for determining whether the number of speakers of the sound included in the input sound data 10 is one or multiple, using at least the second score. However, the first score may be further used for this determination. FIG. 1 illustrates a case where the first score and the second scores are used for the first determination. Then, the information processing apparatus 2000 makes second determination to determine whether the input sound data 10 includes the sound of the registrant 20, based on the first score, the second scores, and a result of the first determination.

Here, if it is determined that there are a plurality of speakers of the sound included in the input sound data 10, the information processing apparatus 2000 computes a correction score using at least the second scores, and compares the computed correction score with a threshold value, thereby making the second determination. On the other hand, if it is determined that there is only one speaker of the sound included in the input sound data 10, the information processing apparatus 2000 makes the second determination by comparing the first score with a threshold value. In either case, if the score is equal to or higher than the threshold value, it is determined that the input sound data 10 includes the sound of the registrant 20, and if the score is less than the threshold value, it is determined that the input sound data 10 does not include the sound of the registrant 20.

<Advantageous Effect>

The information processing apparatus 2000 of the present example embodiment computes a second score representing the degree of similarity with the registrant sound data 22 for each of the plurality of pieces of segmented sound data 12 obtained by segmenting the input sound data 10, and determines whether the number of speakers of the sound included in the input sound data 10 is one or multiple, using at least the second scores. Then, using this determination result, it is determined whether the input sound data 10 includes the sound of the registrant 20. In such a manner, by determining whether the number of speakers of the sound included in the input sound data 10 is one or multiple, whether the input sound data 10 includes the sound of a person other than the registrant 20 is considered. In consideration of the above, it is possible to determine whether the input sound data 10 includes the sound of the registrant 20. Therefore, according to the information processing apparatus 2000, it is possible to improve the accuracy of speaker recognition in the case where the input sound data 10 includes the sound of a person other than the registrant 20.

More specifically, in a case where the input sound data 10 includes the sounds of a plurality of persons, a correction score is computed, and it is determined whether the input sound data 10 include the sound of the registrant 20, using the correction score. In such a manner, the determination on whether the input sound data 10 including the sounds of a plurality of persons includes the sounds of the registrants 20 is made not directly using the score (that is, the first score) computed for the entire input sound data 10 but using the corrected score. Thereby, it is possible to make the determination with higher accuracy.

Speaker recognition using the information processing apparatus 2000 can be used in various situations. For example, the speaker recognition may be used for biometric authentication using sound data. Specifically, the speaker recognition is performed using sound data generated by recording a sound emitted by a person to be authenticated.

Here, high accuracy is required for biometric authentication. In addition, it is highly probable that there are people other than the person to be recognized in the place where biometric authentication is performed.

According to the information processing apparatus 2000 of the present example embodiment, even if sound data of a person other than the person to be recognized is mixed in the recorded sound data of the sound emitted by the person to be recognized, the speaker recognition can be performed with high accuracy. Therefore, even in an environment where there is a person other than the person to be recognized, biometric authentication using sound data can be implemented with high accuracy.

The above description with reference to FIG. 1 is an example for facilitating understanding of the information processing apparatus 2000, and does not limit the function of the information processing apparatus 2000. Hereinafter, the information processing apparatus 2000 of the present example embodiment will be described in more detail.

<Example of Functional Configuration of Information Processing Apparatus 2000>

Figure 2:
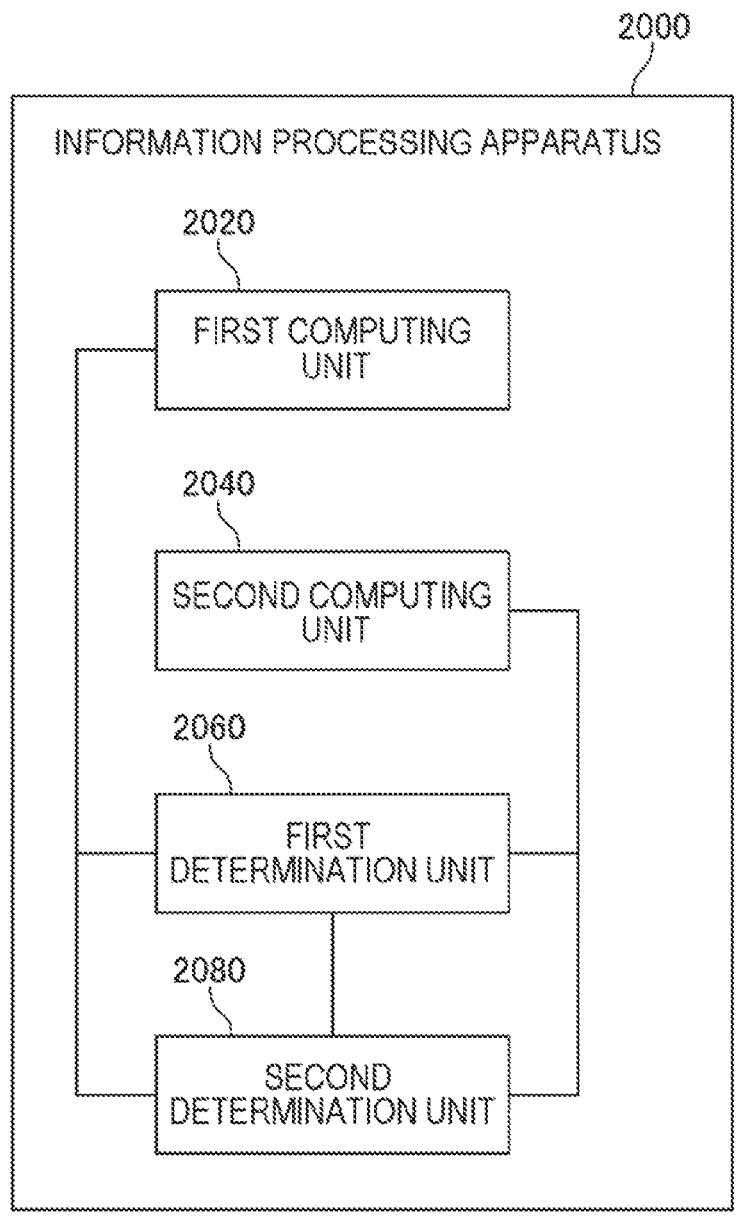
FIG. 2 is a diagram illustrating a functional configuration of an information processing apparatus according to Example Embodiment 1.

FIG. 2 is a diagram illustrating a functional configuration of the information processing apparatus 2000 according to the Example Embodiment 1. The information processing apparatus 2000 includes a first computing unit 2020, a second computing unit 2040, a first determination unit 2060, and a second determination unit 2080. The first computing unit 2020 computes a first score representing the degree of similarity between the input sound data 10 and the registrant sound data 22. The second computing unit 2040 segments the input sound data 10 into a plurality of pieces of segmented sound data 12, and computes a second score representing the degree of similarity with the registrant sound data 22 for each segmented sound data 12. The input sound data 10 is segmented in the time direction. The first determination unit 2060 determines whether the number of speakers of sound included in the input sound data 10 is one or multiple, using at least the second score. The second determination unit 2080 determines whether the input sound data 10 includes sound of the registrant 20, based on the first score, the second scores, and the determination result obtained by the first determination unit 2060.

<Hardware Configuration of Information Processing Apparatus 2000>

Each functional component unit of the information processing apparatus 2000 may be implemented by hardware (for example, a hard-wired electronic circuit or the like) that implements each functional component unit or a combination of hardware and software (for example, a combination of an electronic circuit and a program for controlling the electronic circuit or the like). Hereinafter, a case where each functional component unit of the information processing apparatus 2000 is implemented by a combination of hardware and software will be further described.

Figure 3:
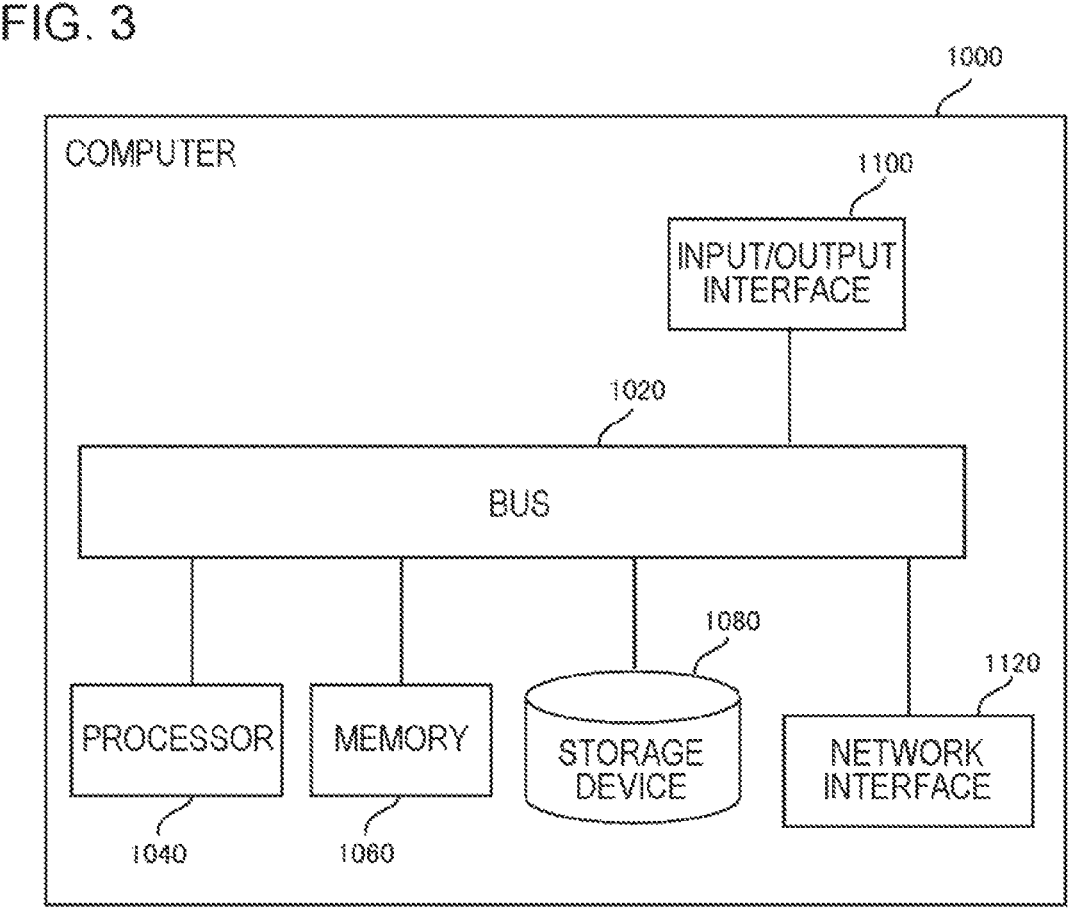
FIG. 3 is a diagram illustrating a computer for implementing the information processing apparatus.

FIG. 3 is a diagram illustrating a computer 1000 for implementing the information processing apparatus 2000. The computer 1000 is an optional computer. For example, the computer 1000 is a personal computer (PC), a server machine, or the like. The computer 1000 may be a dedicated computer designed for achieving the information processing apparatus 2000 or may be a general-purpose computer.

The computer 1000 includes a bus 1020, a processor 1040, a memory 1060, a storage device 1080, an input/output interface 1100, and a network interface 1120. The bus 1020 is a data transmission path through which the processor 1040, the memory 1060, the storage device 1080, the input output interface 1100, and the network interface 1120 mutually transmit and receive data. However, a method of connecting the processors 1040 and the like to each other is not limited to a bus connection.

The processor 1040 is various types of processors such as a central processing unit (CPU), a graphics processing unit (GPU), and a field-programmable gate array (FPGA). The memory 1060 is a main storage implemented by using a random access memory (RAM) or the like. The storage device 1080 is an auxiliary storage implemented by using a hard disk, a solid state drive (SSD), a memory card, a read only memory (ROM), or the like.

The input/output interface 1100 is an interface for connecting the computer 1000 and input/output devices. For example, an input apparatus such as a keyboard and an output apparatus such as a display apparatus are connected to the input/output interface 1100. The network interface 1120 is an interface for connecting the computer 1000 to a communication network. The communication network is, for example, a local area network (LAN) or a wide area network (WAN). A method of connecting the network interface 1120 to the communication network may be a wireless connection or a wired connection.

The storage device 1080 stores a program module that implements each functional component of the information processing apparatus 2000. The processor 1040 implements a function corresponding to each program module by reading each of the program modules into the memory 1060 and executing the program module.

The storage device 1080 may further store the registrant sound data 22. However, the registrant sound data 22 may be any information that can be acquired from the computer 1000, and does not have to be stored in the storage device 1080. For example, the registrant sound data 22 can be stored in a database server connected to the computer 1000 via the network interface 1120.

Further, instead of the registrant sound data 22 itself, the feature value extracted from the registrant sound data 22 may be stored in the storage device. In such a case, the registrant sound data 22 does not have to be obtained from the information processing apparatus 2000.

<Flow of Processing>

Figure 4:
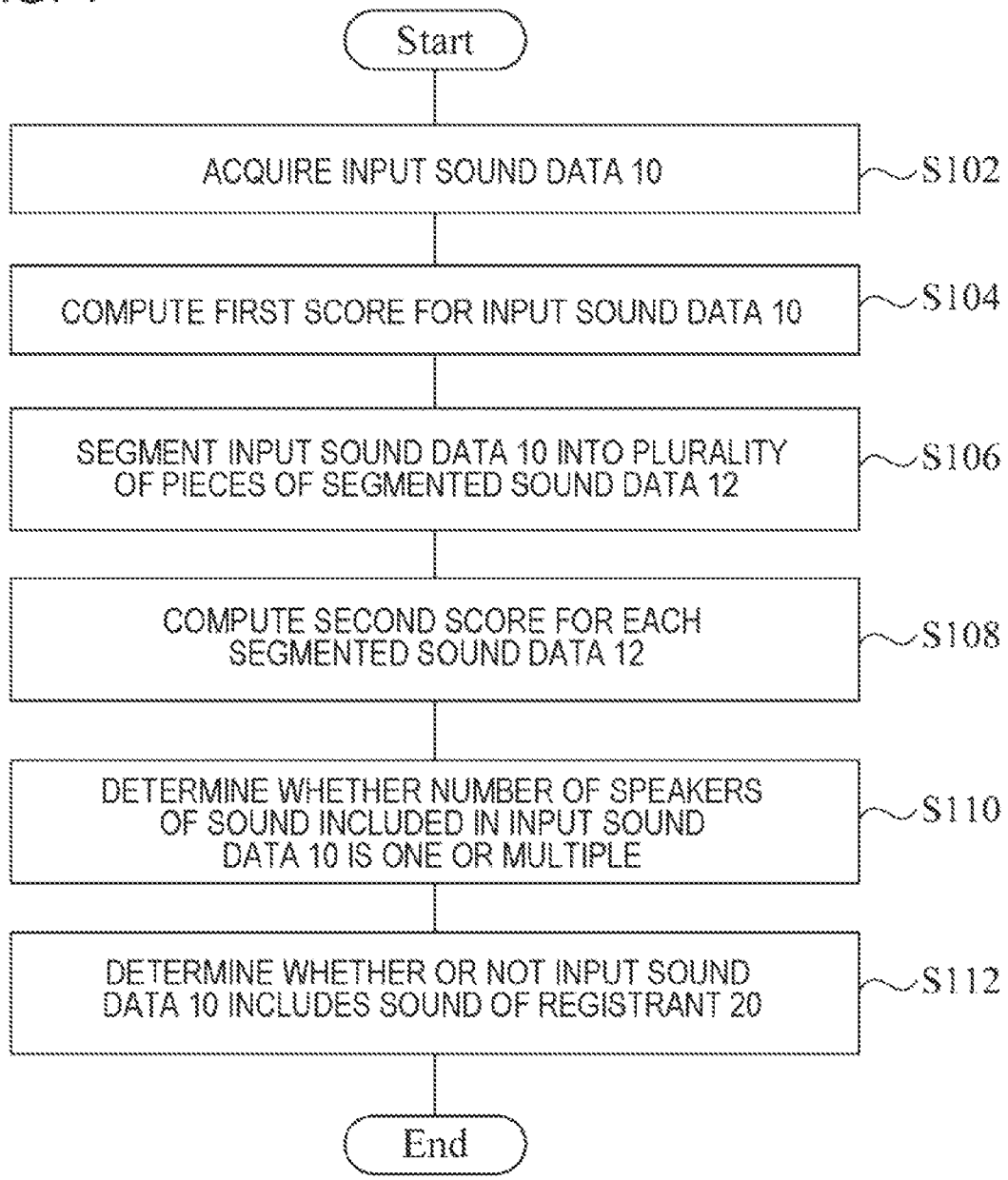
FIG. 4 is a flowchart illustrating a flow of processing executed by the information processing apparatus according to the Example Embodiment 1.

FIG. 4 is a flowchart illustrating the flow of processing executed by the information processing apparatus 2000 according to the Example Embodiment 1. The first computing unit 2020 acquires the input sound data 10 (S102). The second computing unit 2040 computes the first score (S104). The second computing unit 2040 segments the input sound data 10 into a plurality of pieces of segmented sound data 12 (S106). The second computing unit 2040 computes the second score for each segmented sound data 12 (S108). The first determination unit 2060 makes a first determination (determination on whether the number of speakers of the sound included in the input sound data 10 is one or multiple) (S110). The second determination unit 2080 makes a second determination (determination on whether the input sound data 10 includes the sound of the registrant 20) (S112).

<Acquisition of Input Sound Data 10: S102>

The first computing unit 2020 acquires the input sound data 10 (S102). The input sound data 10 is sound data to be subjected to speaker recognition. The method in which the first computing unit 2020 acquires the input sound data 10 is optional. For example, the first computing unit 2020 acquires the input sound data 10 from the storage device in which the input sound data 10 is stored. The storage device in which the input sound data 10 is stored may be provided inside the information processing apparatus 2000 or may be provided outside. In addition, for example, the first computing unit 2020 acquires the input sound data 10 by receiving the input sound data 10 transmitted by another apparatus.

As will be described later, the feature value extracted from the input sound data 10 is used to compute the first score and the second scores. The first computing unit 2020 may acquire the feature value extracted in advance from the registrant sound data 22 instead of acquiring the registrant sound data 22. In such a case, the feature value extracted from the registrant sound data 22 is stored in an optional storage device in advance.

<Computing of First Score: S104>

The first computing unit 2020 computes the first score by comparing the input sound data 10 with the registrant sound data 22 (S104). More specifically, the first computing unit 2020 computes the degree of similarity of the feature values extracted from each of the input sound data 10 and the registrant sound data 22, and sets the computed degree of similarity as the first score.

As the feature values used for computing the first score and the second scores, any feature value that can be extracted from the sound data can be used. The feature values that can be extracted from the sound data are, for example, information representing physical amounts such as a spectrum envelope characteristic that reflects vocal tract information and a fundamental frequency characteristic that reflects vocal cord information. As a more specific example, an i-vector computed using the mel-frequency cepstrum coefficients (MFCC) can be used. For example, probabilistic linear discriminant analysis (PLDA) can be used to compute a score that more accurately represents the degree of similarity between feature values by reducing information that does not contribute to speaker identification in the i-vector space. Note that existing techniques can be used as a specific technique of extracting feature values from sound data and a specific technique of computing the degree of similarity between feature values.

<Segmentation of Input Sound Data 10: S106>

The second computing unit 2040 divides the input sound data 10 into a plurality of pieces of segmented sound data 12 by segmenting the input sound data 10 in the time direction (S106). Here, various methods can be adopted as the method of segmenting the input sound data 10. A specific example of the method will be described below.

<<Method of Segmentation by Predetermined Length of Time >>

Figure 5A:
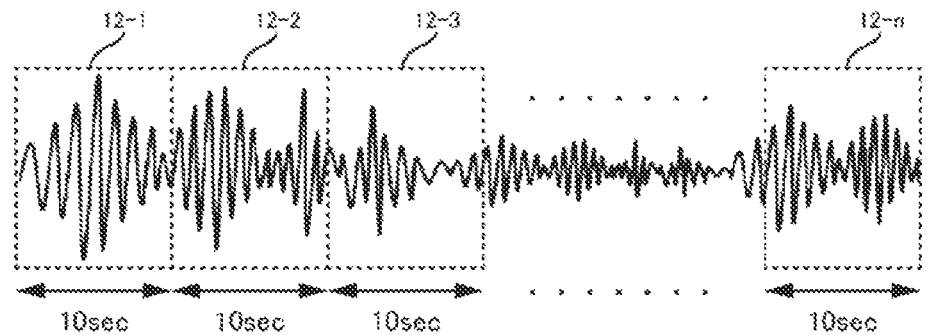
FIGS. 5A to 5C are diagrams illustrating input sound data segmented by a predetermined length.
Figure 5B:
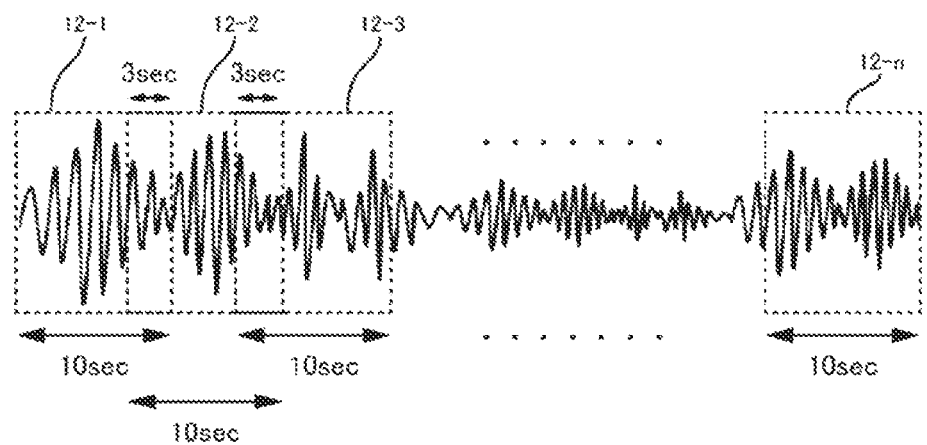
Figure 5C:
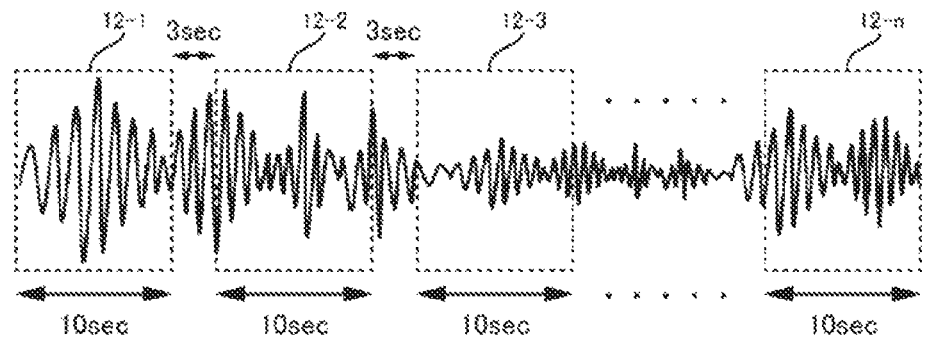

For example, the second computing unit 2040 divides the input sound data 10 into a plurality of pieces of segmented sound data 12 by segmenting the input sound data 10 into a plurality of pieces of sound data each having a predetermined length (10 seconds, or the like). FIGS. 5A to 5C are diagrams illustrating the input sound data 10 segmented by a predetermined length. In FIGS. 5A to 5C, the predetermined length, that is, the length of the segmented sound data 12 is 10 seconds.

Here, as illustrated in FIG. 5B, adjacent segmented sound data 12 may be segmented such that a part of them overlap each other. In FIG. 5B, two adjacent segmented sound data 12 overlap each other for 3 seconds.

Further, as illustrated in FIG. 5C, adjacent segmented sound data 12 may be separated from each other in the time direction. In FIG. 5C, the two adjacent segmented sound data 12 are separated by 3 seconds.

<<Method of Segmentation at Speaker Exchange Point>>

For example, the second computing unit 2040 detects the speaker exchange point in the input sound data 10 and sections the input sound data 10 at the speaker exchange point, thereby segmenting the input sound data 10 into a plurality of pieces of segmented sound data pieces 12. As a technique of detecting a speaker exchange point, a technique described in Non-Patent Document 2 or the like can be used.

<Computing of Second Score: S108>

The second computing unit 2040 computes the second score for each segmented sound data 12 (S108). The second computing unit 2040 extracts the feature value from each segmented sound data 12. Then, the second computing unit 2040 computes the degree of similarity between the feature value extracted from the segmented sound data 12 and the feature value extracted from the registrant sound data 22, and uses the computed degree of similarity as the second score of the segmented sound data 12.

<First Determination: S110>

The first determination unit 2060 determines whether the number of speakers of the sound included in the input sound data 10 is one or multiple, using at least the second score (S110). However, as described above, the first score may be further used for this determination. For example, the first determination unit 2060 compares the first score with the maximum value of the second scores. Specifically, the first determination unit 2060 determines the maximum value from the plurality of second scores computed by the second computing unit 2040, and determines that there are a plurality of speakers of the sound included in the input sound data 10 if the first score is less than the maximum value. On the other hand, if the first score is equal to or higher than the maximum value of the second scores, the first determination unit 2060 determines that there is only one speaker of the sound included in the input sound data 10.

Figure 6A:
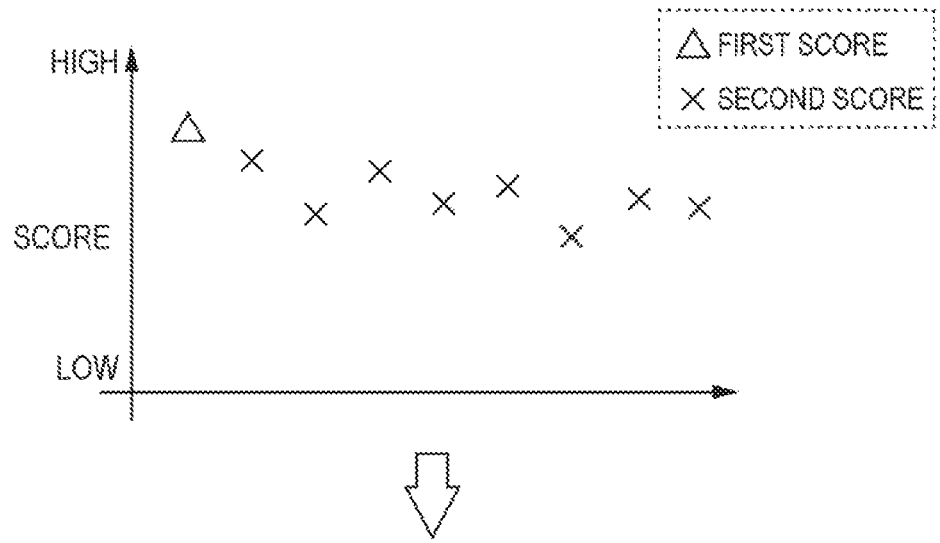
FIGS. 6A and 6B are diagrams graphically illustrating a first score and second scores.
Figure 6B:
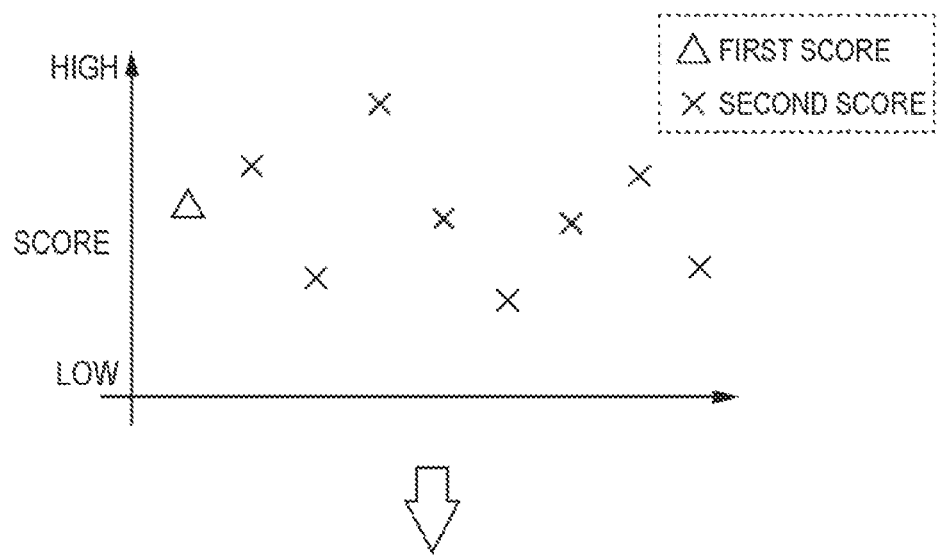

Hereinafter, the grounds for the above-mentioned determination will be described with reference to FIGS. 6A and 6B. FIGS. 6A and 6B are diagrams graphically illustrating the first score and the second scores. FIG. 6A illustrates a case where the input sound data 10 includes only the sound of the registrant. On the other hand, FIG. 6B illustrates a case where the input sound data 10 includes sounds other than the registrant.

In general, the score representing the degree of similarity between feature values depends on the length of the input sound. Specifically, the amount of information used for extracting the feature value decreases as the input sound becomes shorter. Therefore, the shorter the input sound, the lower the accuracy in feature value (the feature value represents the characteristic of the speaker) extracted. For this reason, if the input sound data 10 includes only the sound of the registrant 20, the first score will be greater than any second score. That is, the first score is greater than the maximum value of the second scores (refer to FIG. 6A).

On the other hand, if the input sound data 10 includes the sound of a person other than the sound of the registrant 20, the second score may be higher than the first score (refer to FIG. 6B). The reason for this is that even if the entire input sound data 10 includes the sound of a person other than the registrant 20, the segmented sound data 12 which is a part of the input sound data 10 may scarcely include the sound of a person other than the registrant 20. It is considered that the feature value extracted from such segmented sound data 12 have higher degrees of similarity to the feature value extracted from the registrant sound data 22 as compared with the feature value extracted from the input sound data 10. Therefore, there may be a second score that is greater than the first score. That is, the maximum value of the second scores may be greater than the first score.

From the above, in a case where the first score is less than the maximum value of the second scores, the input sound data 10 is highly likely to include the sound of a person other than the sound of the registrant 20. Therefore, as described above, if the first score is less than the maximum value of the second scores, the first determination unit 2060 determines that there are a plurality of speakers of the sound included in the input sound data 10.

However, the method of determining whether the number of speakers of the sound included in the input sound data 10 is one or multiple is not limited to the method of comparing the maximum value of the first score and the second scores. For example, the first determination unit 2060 computes an index value representing the magnitude of variation of the values of the plurality of second scores, and compares the index value with a predetermined threshold value, thereby determining whether the number of speakers of the sound included in the input sound data 10 is one or multiple. Specifically, the first determination unit 2060 determines that there are a plurality of speakers of the sound included in the input sound data 10 if the computed index value is equal to or higher than a predetermined threshold value, and determines that there is only one speaker of the sound included in the input sound data 10 if the computed index value is less than the predetermined threshold value. Here, as the index value representing the magnitude of the variation of the values of the plurality of second scores, a value such as a difference between the maximum value and the minimum value of the second scores, a variance of the second scores, or a standard deviation of the second scores can be used.

In addition, for example, a prediction model, which determines whether the number of speakers of the sound included in the input sound data 10 is one or multiple in response to inputting the first score and the second scores computed from the input sound data 10, may be constructed in advance. As such a prediction model, various models that achieve classification such as support vector machines, neural networks, and linear classifiers can be used. The first determination unit 2060 inputs the first score computed by the first computing unit 2020 and the second scores computed by the second computing unit 2040 into the trained prediction model. As the output of the prediction model, a result of determining whether the number of speakers of the sound included in the input sound data 10 is one or multiple can be obtained.

The learning of the prediction model is executed in advance using the learning data generated from sound data in which the number of speakers is given. Specifically, the first score is computed for the entire sound data in which the number of speakers is given, and the second score is computed for each of the plurality of pieces of segmented sound data obtained by segmenting the sound data. Then, the prediction model is trained by using the combination of "the given number of speakers, the computed first score, and the computed second scores" as training data. The sound used for the learning of the prediction model does not need to include the sound of the registrant 20.

The prediction model may be constructed so as to use only the second scores without using the first score. That is, a prediction model for determining whether the number of speakers of the sound included in the input sound data 10 is one or multiple is constructed in advance in response to the input of the second scores computed from the input sound data 10. The types of models that can be adopted are the same as in the case of using the first score. Further, in the learning of the prediction model, learning data, in which the second score computed for each of the plurality of pieces of segmented sound data obtained by segmenting the sound data in which the number of speakers is given was associated with the given number of speakers, is used.

<Second Determination: S112>

The second determination unit 2080 makes a second determination (S112). Specifically, the second determination unit 2080 determines whether the input sound data 10 includes the sound of the registrant 20 based on the first score, the second scores, and the result of the first determination (S112). Here, a specific method of the second determination differs depending on the result of the first determination. Hereinafter, the specific method of the second determination will be described for each result of the first determination.

<<Case Where There is Only One Speaker of Sound Included in Input Sound Data 10>>

If it is determined that there is only one speaker of the sound included in the input sound data 10, the second determination unit 2080 compares the first score with the threshold value. If the first score is equal to or higher than the threshold value, the second determination unit 2080 determines that the input sound data 10 includes the sound of the registrant 20. On the other hand, if the first score is less than the threshold value, the second determination unit 2080 determines that the input sound data 10 does not include the sound of the registrant 20. This threshold value is stored in advance in a storage device accessible from the information processing apparatus 2000.

<<Case Where There are Plurality of Speakers of Sound Included in Input Sound Data 10>>

If it is determined that there are a plurality of speakers of the sound included in the input sound data 10, the second determination unit 2080 computes a correction score using at least the second scores, and compares the computed correction score with the above threshold value. If the correction score is equal to or higher than the threshold value, the second determination unit 2080 determines that the input sound data 10 includes the sound of the registrant 20. On the other hand, if the first score is less than the threshold value, the second determination unit 2080 determines that the input sound data 10 does not include the sound of the registrant 20.

Various methods can be adopted as the method for computing the correction score. Hereinafter, a method of computing the correction score will be exemplified.

<<Computing Method 1 of Correction Score>>

For example, the second determination unit 2080 generates a histogram representing the number of second scores included in each of the plurality of subranges into which the domain of the second scores is segmented, and computes the correction score using this histogram. For example, in a case where the domain of the second score S2 is "$0 \leq S2 \leq 100$", this domain is divided into 10 equal subranges ("$0 \leq S2 < 10$", ..., "$80 \leq S2 < 90$", "$90 \leq S2 \leq 100$"). The second determination unit 2080 computes the number of second scores computed from the segmented sound data 12 for each of these subranges.

FIG. 7 is a diagram illustrating a histogram of the second scores. In the example of FIG. 7, the domain of the second score S2 is "$0 \leq S2 \leq 100$" as in the above-mentioned example, and this domain is divided into 10 equal parts. Then, the number of the second scores in each subrange is represented by a graph.

The second determination unit 2080 determines one or more subranges showing peaks from the above-mentioned histogram, and also determines the subrange having the maximum second score among the determined subranges. The subrange determined here is called an attention range. For example, in the example of FIG. 7, there are two subranges showing peaks, "$20 \leq S2 < 30$" and "$60 \leq S2 < 70$". In the subranges, the subrange in which the second score is the maximum is "$60 \leq S2 < 70$". Therefore, "$60 \leq S2 < 70$" is determined as the attention range.

In the subrange showing the peak in the histogram of the second score, it is considered that the speaker of the sound included in the segmented sound data 12 is mostly one person. In particular, since speakers often take turns speaking in conversations, one segmented sound extracted from the sound in which conversations are recorded (such as telephone recordings) often includes only one speaker. Then, in the segmented sound data 12 in which the main speaker is the registrant 20, it is considered that the computed second score is higher than that in the segmented sound data 12 in which the main speaker is a person other than the registrant 20. Therefore, the numerical range which has the maximum second score among the numerical ranges representing the peaks, that is, the attention range includes the second score computed for the segmented sound data 12 in which the main speaker is the registrant 20.

Therefore, the second determination unit 2080 computes the correction score using the attention range. For example, the second determination unit 2080 uses a statistical value (maximum value, average value, or the like) of the second scores included in the attention range as the correction score.

In addition, for example, the second determination unit 2080 combines a plurality of pieces of segmented sound data 12 included in the attention range to generate one sound data, and computes the feature values extracted from the generated sound data and the degree of similarity with the feature value extracted from the registrant sound data 22, as the correction scores. In general, the longer the sound data is, the more accurate the score can be computed. Therefore, by combining the plurality of pieces of segmented sound data 12 included in the attention range to generate sound data longer than the segmented sound data 12 and computing the score for this sound data, it is possible to obtain scores more accurate than the scores computed for the segmented sound data 12. Therefore, by using the scores computed in such a manner as the correction scores, it is possible to determine whether the input sound data 10 includes the sound of the registrant 20 by using the more accurate scores.

Here, in the second determination unit 2080, the plurality of pieces of segmented sound data 12 to be combined as described above may include not only the segmented sound data 12 included in the attention range but also the segmented sound data 12 included in each subrange having a second score greater than the attention range. In other words, the second determination unit 2080 combines all the segmented sound data 12, of which the computed second scores are equal to or higher than the lower limit value of the attention range, to generate one sound data. For example, in the example of FIG. 7, eight pieces of segmented sound data 12 each having a second score of 60 or more are combined to generate one sound data and the degree of similarity with the registrant sound data 22 computed for this sound data is used as the correction score.

<<Computing Method 2 of Correction Score>>

In addition, for example, a prediction model that receives the first score and the second scores as inputs and outputs a correction score may be provided. The second determination unit 2080 obtains a correction score by inputting the first score computed by the first computing unit 2020 and the second scores computed by the second computing unit 2040 into the prediction model.

Here, as a prediction model, the following two models are used: 1) a prediction model that extracts the distribution (the distribution including the above-mentioned attention range) of the second scores obtained from segmented sounds of a speaker who is closest to the registrant 20 among the distribution of all the second scores; and 2) a prediction model that computes the correction score based on the extracted distribution.

For the former prediction model, for example, a Gaussian mixture model (GMM) can be used. The second determination unit 2080 constructs a GMM using a plurality of second scores computed by the second computing unit 2040. By using GMM, the distribution of all the second scores obtained from the input sound data 10 can be segmented into a plurality of Gaussian distributions. Among the plurality of Gaussian distributions, the distribution in which the average value of the second scores is the largest is considered to be the distribution including the above-mentioned attention range. Therefore, the second determination unit 2080 extracts the Gaussian distribution having the maximum average value of the second scores from the plurality of Gaussian distributions obtained by using the GMM. Known algorithms such as Expectation Maximization (EM) and Maximum A Posteriori (MAP) can be used to build GMM.

As a prediction model that computes a correction score based on the distribution of the second scores, various prediction models that implements regression such as support vector regression (SVR) and a neural network can be used. This prediction model learns how the first score and the distribution of the second scores are correspond each other as to a sound of which the speaker is one person. By performing such learning, the prediction model can output the first score, which is predicted to correspond to the distribution of the second scores, as the correction score in response to the input of the distribution of the second scores.

The learning data used for learning this prediction model can be generated by using optional sound of which the speaker is one person. Specifically, the first score is computed for the entire data of the sound of which the speaker is one person. Further, the sound data is segmented into a plurality of pieces of segmented sound data, and the second score is computed for each segmented sound data. In such a manner, it is possible to obtain a correspondence relationship between the first score and the plurality of second scores (distribution of the second scores) in the sound of which the speaker is one person. Then, the prediction model learns the correspondence between the computed first score and the plurality of second scores. By such learning, the prediction model is trained to output, in response to the input of the distribution of the second scores, the corresponding first score.

<Regarding Registrant Sound Data 22>

In the above description, the registrant sound data 22 used for comparison with the input sound data 10 is determined as one. As a case where the registrant sound data 22 to be compared with the input sound data 10 can be determined as one, for example, a case where an input of an identifier (user ID or the like) for identifying the registrant 20 is separately received is considered. Specifically, the information processing apparatus 2000 receives an input of an identifier (for example, a character string) for identifying the registrant 20, and acquires the registrant sound data 22 stored in the storage device in association with the received identifier. Then, the information processing apparatus 2000 performs the above-mentioned series of speaker recognition processing by using the registrant sound data 22 (processing illustrated in the flowchart of FIG. 4). Such speaker recognition can be used, for example, in a case where user authentication is performed using a pair of a user ID and a user sound instead of user authentication using a pair of a user ID and a password.

On the other hand, the registrant sound data 22 used for comparison with the input sound data 10 does not have to be determined as one. For example, the information processing apparatus 2000 acquires the registrant sound data 22 one by one from a storage device in which a plurality of pieces of registrant sound data 22 are stored, and performs the above-mentioned series of speaker recognition processing on the registrant 20 corresponding to the acquired registrant sound data 22.

It is assumed that, in the speaker recognition processing performed on the acquired registrant sound data 22, it is determined that the input sound data 10 includes the sound of the registrant 20. In such a case, the information processing apparatus 2000 ends the speaker recognition processing. In such a case, it is determined that the input sound data 10 includes the sound of the registrant 20 corresponding to the registrant sound data 22 as a processing target. On the other hand, it is assumed that, in the speaker recognition processing performed on the acquired registrant sound data 22, it is determined that the input sound data 10 does not include the sound of the registrant 20. In such a case, the information processing apparatus 2000 acquires the next registrant sound data 22 from the storage device in which the registrant sound data 22 is stored, and performs the speaker recognition processing on the registrant sound data 22. Such speaker recognition can be used, for example, in a case where user authentication is performed using only the user's sound instead of performing user authentication using a pair of a user ID and a password.

<Output of Determination Result>

The second determination unit 2080 may output the result of the second determination, that is, information representing whether the input sound data 10 includes the sound of the registrant 20. Various methods can be adopted as the output method of the result of the second determination. For example, the second determination unit 2080 outputs information representing the result of the second determination to the display apparatus connected to the information processing apparatus 2000. In addition, for example, the second determination unit 2080 may store information representing the result of the second determination in a storage device connected to the information processing apparatus 2000.

The information representing the result of the second determination is, for example, a character string representing information that "the input sound data 10 includes the sound of the registrant 20" or information that "the input sound data 10 does not include the sound of the registrant 20", an image, a sound, or the like. In addition to the information representing the result of the second determination, the second determination unit 2080 may output information (that is, information representing the result of the first determination) representing whether the number of speakers of the sound included in the input sound data 10 is one or multiple, or information representing the score (the first score or the correction score) compared with the threshold value. In such a manner, a user of the information processing apparatus 2000 can grasp not only the result of the determination as to whether the input sound data 10 includes the sound of the registrant 20, but also the basis of the determination.

Further, in a case where the registrant sound data 22 to be compared with the input sound data 10 is not determined as one and the plurality of pieces of registrant sound data 22 are sequentially compared with the input sound data 10, the information processing apparatus 2000 may output information (for example, an identifier of the registrant) that identifies the registrant whose sound is included in the input sound data 10.

Although the example embodiments have been described above with reference to the drawings, these are examples, and configurations in which the configurations of the above example embodiments are combined or various configurations other than the above configurations can be adopted.

What is claimed is:

1. An information processing apparatus comprising:
   at least one memory storing instructions; and
   at least one processor configured to execute the instructions to:
   compute a first score representing a degree of similarity between input sound data and registrant sound data which is sound data of a registrant;
   segment the input sound data in a time direction so as to divide the input sound data into a plurality of pieces of segmented sound data and compute a second score representing a degree of similarity between the segmented sound data and the registrant sound data for each of the plurality of pieces of segmented sound data;
   determine whether a number of speakers of sound included in the input sound data is one or multiple, using at least the second score for each piece of segmented sound data;
   determine whether the input sound data includes sound of the registrant, based on the first score, the second score for each piece of segmented sound data, and whether the number of speakers of the sound is one or multiple,
   when a plurality of speakers of the sound has been determined as being included in the input sound data, compute a correction score, which is a corrected version of the second score, using at least the second score for each piece of segmented sound data, and compare the computed correction score with a threshold value to determine whether the input sound data includes the sound of the registrant; and
   when only one speaker of the sound has been determined as being included in the input sound data, compare the first score with the threshold value to determine whether the input sound data includes the sound of the registrant.

2. The information processing apparatus according to claim 1,
   wherein the processor is configured to generate a distribution of a number of second scores included in each of a plurality of subranges included in a domain of the second scores, determines the subrange having a maximum second score from among the subranges corresponding to peaks in the distribution, and compute the correction score using the second scores included in the determined subrange.

3. The information processing apparatus according to claim 2,
   wherein the processor is configured to compute a statistical value of the second scores included in the determined subrange as the correction score.

4. The information processing apparatus according to claim 2,
   wherein the processor is configured to generate one sound data by combining the pieces of the segmented sound data for which the second scores included in the determined subrange are computed, or generate the one sound data by combining the pieces of the segmented sound data for which the second scores equal to or higher than a lower limit value of the determined subrange are computed, and compute the degree of similarity between the generated sound data and the registrant sound data as the correction score.

5. The information processing apparatus according to claim 1,
   wherein the processor is configured to compute the correction score by inputting the second scores to a prediction model trained to output the correction score in response to input of the second scores.

6. The information processing apparatus according to claim 1,
   wherein the processor is configured to determine that there are the plurality of speakers of the sound included in the input sound data in a case where the first score is less than a maximum value of the second scores.

7. The information processing apparatus according to claim 1,
wherein the processor is configured to compute an index value representing a variation of the second scores, and determine that there are the plurality of speakers of the sound included in the input sound data in a case where the computed index value is equal to or greater than the threshold value.

8. The information processing apparatus according to claim 1,
wherein the processor is configured to determine whether the number of speakers of sound included in the input sound data is one or multiple, by inputting only the second scores or both the first score and the second scores to a trained prediction model, and
the prediction model is trained such that whether the number of speakers of sound included in the input sound data is one or multiple is determined in response to input of the second scores or input of both the first score and the second scores.

9. A control method executed by a computer, the control method comprising:
a first computing step of computing a first score representing a degree of similarity between input sound data and registrant sound data which is sound data of a registrant;
a second computing step of segmenting the input sound data in a time direction so as to divide the input sound data into a plurality of pieces of segmented sound data and computing a second score representing a degree of similarity between the segmented sound data and the registrant sound data for each of the plurality of pieces of the segmented sound data;
a first determination step of determining whether a number of speakers of sound included in the input sound data is one or multiple, using at least the second score for each piece of segmented sound data; and
a second determination step of determining whether the input sound data includes sound of the registrant, based on the first score, the second score for each piece of segmented sound data, and whether the number of speakers of the sound is one or multiple,
wherein, in the second determination step,
when a plurality of speakers of the sound has been determined as being included in the input sound data, a correction score, which is a corrected version of the second score, is computed using at least the second score for each piece of segmented sound data, and the computed correction score is compared with a threshold value to determine whether the input sound data includes the sound of the registrant, and
when only one speaker of the sound has been determined as being included in the input sound data, in the second determination step, the first score is compared with the threshold value to determine whether the input sound data includes the sound of the registrant.

10. The control method according to claim 9,
wherein, in the second determination step, distribution of a number of second scores included in each of a plurality of subranges included in a domain of the second score is generated, the subrange having a maximum second score is determined from among the subranges corresponding to peaks in the distribution, and the correction score is computed using the second scores included in the determined subrange.

11. The control method according to claim 10,
wherein, in the second determination step, a statistical value of the second scores included in the determined subrange is computed as the correction score.

12. The control method according to claim 10,
wherein, in the second determination step,
one sound data is generated by combining the pieces of the segmented sound data for which the second scores included in the determined subrange are computed, or one sound data is generated by combining the pieces of the segmented sound data for which the second scores equal to or higher than a lower limit value of the attention range are computed, and
the degree of similarity between the generated sound data and the registrant sound data is computed as the correction score.

13. The control method according to claim 9,
wherein, in the second determination step, the correction score is computed by inputting the second scores, which are computed by the second computing step, to a prediction model trained to output the correction score in response to input of the second scores.

14. The control method according to claim 9,
wherein, in the first determination step, that there are the plurality of speakers of the sound included in the input sound data is determined in a case where the first score is less than a maximum value of the second scores.

15. The control method according to claim 9,
wherein, in the first determination step, an index value representing a variation of the second scores is computed, and that there are the plurality of speakers of the sound included in the input sound data is determined in a case where the computed index value is equal to or greater than the threshold value.

16. The control method according to claim 9,
wherein, in the first determination step, whether the number of speakers of sound included in the input sound data is one or multiple is determined by inputting only the second scores or both the first score and the second scores to a trained prediction model, and
the prediction model is trained such that whether the number of speakers of sound included in the input sound data is one or multiple is determined in response to input of the second scores or input of both the first score and the second scores.

17. A non-transitory computer readable medium storing a program that causes a computer to execute each step of a control method, the method comprising:
a first computing step of computing a first score representing a degree of similarity between input sound data and registrant sound data which is sound data of a registrant;
a second computing step of segmenting the input sound data in a time direction so as to divide the input sound data into a plurality of pieces of segmented sound data and computing a second score representing a degree of similarity between the segmented sound data and the registrant sound data for each of the plurality of pieces of the segmented sound data;
a first determination step of determining whether a number of speakers of sound included in the input sound data is one or multiple, using at least the second score for each piece of segmented sound data; and
a second determination step of determining whether the input sound data includes sound of the registrant, based on the first score, the second score for each piece of segmented sound data, and whether the number of speakers of the sound is one or multiple, wherein, in the second determination step, when a plurality of speakers of the sound has been determined as being included in the input sound data, a correction score, which is a corrected version of the second score, is computed using at least the second score for each piece of segmented sound data, and the computed correction score is compared with a threshold value to determine whether the input sound data includes the sound of the registrant, and when only one speaker of the sound has been determined as being included in the input sound data, in the second determination step, the first score is compared with the threshold value to determine whether the input sound data includes the sound of the registrant.

* * * * *